United States Patent
Roberts et al.

(10) Patent No.: US 6,479,177 B1
(45) Date of Patent: *Nov. 12, 2002

(54) METHOD FOR IMPROVING THE COLD STARTING CAPABILITY OF AN ELECTROCHEMICAL FUEL CELL

(75) Inventors: Joy A. Roberts, Coquitlan (CA); Jean St-Pierre, Vancouver (CA); Marian E. van der Geest, Vancouver (CA); Abderrahmane Atbi, Vancouver (CA); Nicholas J. Fletcher, Vancouver (CA)

(73) Assignee: Ballard Power Systems Inc., Burnaby (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/406,318

(22) Filed: Sep. 27, 1999

Related U.S. Application Data

(63) Continuation-in-part of application No. 09/138,625, filed on Aug. 24, 1998, now abandoned, which is a continuation of application No. 08/659,921, filed on Jun. 7, 1996, now Pat. No. 5,798,186.

(51) Int. Cl.$^7$ ............................................... H01M 8/04
(52) U.S. Cl. ............................ 429/13; 429/26; 429/34
(58) Field of Search .............................. 429/13, 34, 26

(56) References Cited

U.S. PATENT DOCUMENTS

| | | | |
|---|---|---|---|
| 4,729,932 A | * 3/1988 | McElroy | 429/34 |
| 5,084,144 A | 1/1992 | Reddy et al. | 205/104 |
| 5,366,818 A | * 11/1994 | Wilkinson | 429/13 |
| 5,478,662 A | 12/1995 | Strasser | 429/13 |
| 5,789,092 A | 8/1998 | Spiers et al. | 429/24 |
| 5,798,186 A | * 8/1998 | Fletcher | 429/13 |
| 6,068,941 A | 5/2000 | Fuller et al. | 429/13 |
| 6,103,410 A | 8/2000 | Fuller et al. | 429/13 |

FOREIGN PATENT DOCUMENTS

| | | |
|---|---|---|
| EP | 1 006 601 A2 | 12/2000 |
| JP | 06-223855 | 8/1994 |
| JP | 6-223855 | 8/1994 |
| JP | 7-94202 | 4/1995 |
| JP | 11-273704 | 10/1999 |
| JP | 2000-324617 | 11/2000 |
| WO | WO 97/48142 | 12/1997 |
| WO | WO 00/30200 | 5/2000 |
| WO | WO 00/65676 | 11/2000 |
| WO | WO 01/03217 | 1/2001 |

OTHER PUBLICATIONS

Wilson et al. "Endurance Testing of Low Pt Loading Polymer Electrolyte Fuel Cells", *Proceedings of the Symposium on Electrode Materials and Process for Energy Conversion and Storage*, vol. 94–23, pp. 145–154. (1994).

Simpson et al. "Factors Affecting the Performance of Proton Exchange Membrane Fuel Cells", *Proceedings of the First International Symposium on Proton Conducting Membrane Fuel Cells I*, vol. 95–23, pp. 182–192. (1995).

\* cited by examiner

*Primary Examiner*—Stephen Kalafut
*Assistant Examiner*—Mark Ruthkosky
(74) *Attorney, Agent, or Firm*—McAndrews, Held & Malloy, Ltd.

(57) ABSTRACT

A method of ceasing operation of an electric power generation system improves the cold start capability and freeze tolerance of a fuel cell stack by reducing the amount of water remaining within the passages of the stack. The method involves purging one or more of the fuel cell stack oxidant and fuel passages at shutdown prior to allowing the fuel cell stack to drop to temperatures below the freezing point of water. Preferably purging at shutdown is conducted at a temperature below the stack operating temperature.

14 Claims, 13 Drawing Sheets

METHOD FOR IMPROVING THE COLD STARTING CAPABILITY OF AN ELECTROCHEMICAL FUEL CELL

CROSS-REFERENCE TO RELATED APPLICATIONS

This application is a continuation-in-part of U.S. patent application Ser. No. 09/138,625 filed Aug. 24, 1998, entitled "Method and Apparatus for Commencing Operation of a Fuel Cell Electric Power Generation System Below the Freezing Temperature of Water" now abandoned. The '625 application is a continuation of U.S. patent application Ser. No. 08/659,921 filed Jun. 7, 1996, now U.S. Pat. No. 5,798,186 issued Aug. 25, 1998, also entitled "Method and Apparatus for Commencing Operation of a Fuel Cell Electric Power Generation System Below the Freezing Temperature of Water". The '625 and '921 applications are each hereby incorporated by reference in their entirety.

FIELD OF THE INVENTION

The present invention relates to methods for improving the cold start capability of an electrochemical fuel cell. More particularly, the present invention relates to temperature dependent methods for improving the cold start capability of fuel cell electric power generation systems that include a fuel cell stack.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product.

In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

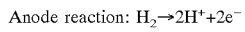

Anode reaction: $H_2 \rightarrow 2H^+ + 2e^-$

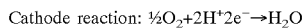

Cathode reaction: $\tfrac{1}{2}O_2 + 2H^+ 2e^- \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell. Separator plates typically do not have flow passages formed in the surfaces thereof, but are used in combination with an adjacent layer of material which provides access passages for the fuel and oxidant to the respective anode and cathode electrocatalyst, and provides passages for the removal of reaction products. The preferred operating temperature range for solid polymer fuel cells is typically 50° C. to 120° C., most typically about 75° C.–85° C.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates. The stack typically includes inlet ports and manifolds for directing the fluid fuel stream (such as substantially pure hydrogen, methanol reformate or natural gas reformate, or a methanol-containing stream in a direct methanol fuel cell) and the fluid oxidant stream (such as substantially pure oxygen, oxygen-containing air or oxygen in a carrier gas such as nitrogen) to the individual fuel cell reactant flow passages. The stack also commonly includes an inlet port and manifold for directing a coolant fluid stream, typically water, to interior passages within the stack to absorb heat generated by the fuel cell during operation. The stack also generally includes exhaust manifolds and outlet ports for expelling the depleted reactant streams and the reaction products such as water, as well as an exhaust manifold and outlet port for the coolant stream exiting the stack. In a power generation system various fuel, oxidant and coolant conduits carry these fluid streams to and from the fuel cell stack.

When an electrical load (comprising one or more load elements) is placed in an electrical circuit connecting the electrodes, the fuel and oxidant are consumed in direct proportion to the electrical current drawn by the load, which will vary with the ohmic resistance of the load.

Solid polymer fuel cells generally employ perfluorosulfonic ion exchange membranes, such as those sold by DuPont under its NAFION trade designation and by Dow under the trade designation XUS 13204.10. When employing such membranes, the fuel and oxidant reactant streams are typically humidified before they are introduced to solid polymer fuel cells so as to facilitate proton transport through the ion exchange membrane and to avoid drying (and damaging) the membrane separating the anode and cathode of each cell.

Each reactant stream exiting the fuel cell stack generally contains water. The outlet fuel stream from the anodes generally contains the water added to humidify the incoming fuel stream plus any product water drawn across the membrane from the cathode. The outlet oxidant stream from the cathodes generally contains the water added to humidify the incoming oxidant stream plus product water formed at the cathode.

In some fuel cell applications, such as, for example, motive applications, it may be necessary or desirable to commence operation of a solid polymer electrolyte fuel cell stack when the stack core temperature is below the freezing temperature of water. As used herein, the freezing temperature of water means the freezing temperature of free water, that is, 0° C. at 1 atmosphere. It may also be necessary or desirable when ceasing operation of the solid polymer fuel cell stack to improve the cold start capability and freeze tolerance of the stack by reducing the amount of water remaining within the fuel, oxidant and coolant passages of the stack. Upon freezing, water remaining within stack passages will expand and potentially damage structures within the stack such as, for example, the membrane/electrocatalyst interface, the reactant passageways, conduits and seals, as well as the porous electrode substrate material.

If there is an expectation that a solid polymer fuel cell stack will be subjected to cold temperatures, especially temperatures below the freezing temperature of water, one or more special start-up and shutdown techniques may be used. These techniques may improve the cold start capability and freeze tolerance of the stack, and improve the subsequent fuel cell performance. A measure of electrochemical fuel cell performance is the voltage output from the cell for a given current density. Higher performance is associated with a higher voltage output for a given current density or higher current density for a given voltage output.

SUMMARY OF THE INVENTION

A first method of ceasing operation of an electric power generation system improves the cold start capability and freeze tolerance of fuel cell stacks by reducing the amount of water remaining within the passages of the stack. The stack comprises a fuel cell stack connectable to an external electrical circuit for supplying electric current to the external circuit. The stack comprises at least one fuel cell comprising a membrane electrode assembly comprising an anode, a cathode, and an ion exchange membrane interposed between the anode and the cathode. The at least one fuel cell further comprises a fuel stream passage for directing a fuel stream to the anode and an oxidant stream passage for directing an oxidant stream to the cathode. Each of the streams is flowable to the fuel cell stack. The method comprises the sequential steps of:

(a) interrupting the supply of electric current from the fuel cell stack to the external circuit;

(b) purging water from at least one of the passages.

Although both the oxidant and fuel stream passages may be purged, it has been found that purging of only the oxidant stream passages generally gives satisfactory results. Thus, in a preferred embodiment of the method, the at least one of the passages is the oxidant stream passage. Step (a) preferably further comprises decreasing the flow rate of at least one of the incoming reactant streams.

The purge in step (b) may be performed at a temperature within the normal stack operating temperature range, however it has been found to be advantageous to significantly reduce the temperature of the fuel cell prior to purging one or both of the reactant stream passages. Thus in a preferred embodiment of a method of ceasing operation of an electric power generation system, the method comprises the sequential steps of:

(a) interrupting the supply of electric current from the fuel cell stack to the external circuit;

(b) reducing the temperature of the fuel cell stack to below its normal operating temperature;

(c) purging water from at least one of the passages.

Preferably in step (b) the temperature is reduced to a predetermined temperature threshold below the normal stack operating temperature before the purge is initiated. The threshold is greater than the freezing temperature of water, and preferably at least about 20° C. below the normal stack operating temperature. It is more preferably in the range of about 15° C. to 30° C., and still more preferably less than about 10° C.

The nominal operating temperature of the stack may be measured directly (for example, by locating a temperature sensor at one or more locations within the stack) or indirectly, for example, by monitoring the temperature of one or more of the fluid streams exiting the stack. In practice, measurements such as these may be used to provide or infer a representative or approximate value for the stack operating temperature.

In the above embodiments of a method, preferably the water is purged from the passages by flowing a fluid stream therethrough. The fluid stream may be, for example, an inert liquid or gas (such as nitrogen) or one of the reactant streams. The water carrying capacity of a gas increases with decreasing gas pressure, so if a gas is used to purge the passage preferably the pressure of the gas is not greater than about 30 psig (207 kPa gauge), and is preferably less than about 5 psig (34 kPa gauge). If both the fuel and reactant gases are to be purged simultaneously, preferably the pressure differential across the membrane during the purge is maintained at less than about 10 psi (69 kPa), and preferably less than about 5 psi (35 kPa).

Optionally, the foregoing system further comprises an incoming fuel stream with a fuel stream humidifier for producing a humidified fuel stream from the incoming fuel stream, and/or an incoming oxidant stream with an oxidant stream humidifier for producing a humidified oxidant stream from the incoming oxidant stream. If the fluid stream used to purge the at least one passage is one of the reactant streams, the respective reactant stream is flowed to purge the passage such that the respective humidifier is bypassed.

The fuel cell stack may further comprise a passage for flowing a coolant stream. If the coolant is water or another coolant that may freeze at the anticipated stack storage temperature, a preferred method includes an additional step comprising purging the coolant from the coolant stream passage. The coolant is preferably purged from the coolant stream passage by directing a fluid stream through the coolant stream passage. The fluid stream can be, for example, the incoming oxidant stream or an inert stream such as nitrogen.

The foregoing purge techniques are effective in situations in which the temperature of at least a portion of the membrane electrode assembly is subsequently to be reduced to below the freezing temperature of water.

A first method of commencing operation of an electric power generation system expedites the warming of the fuel cell stack to within its desired operating temperature range. The system comprises a fuel cell stack connectable to an external electrical circuit for supplying electric current to the external circuit. The stack comprises at least one fuel cell, the at least one fuel cell comprising a membrane electrode assembly comprising an anode, a cathode, and an ion exchange membrane interposed between the anode and the cathode. The system further comprises a fuel stream and an oxidant stream, each of the streams being flowable to the fuel cell stack. The system further comprises a coolant fluid stream flowable in thermal contact with the fuel cell stack. The method comprises:

supplying electric current from the fuel cell stack to the external circuit such that the temperature of the at least one fuel cell increases; and flowing the coolant fluid stream in thermal contact with the fuel cell stack only after the operating temperature of the stack exceeds a predetermined temperature threshold.

The nominal operating temperature of the stack may be measured directly (for example, by locating a temperature sensor at one or more locations within the stack) or indirectly, for example, by monitoring the temperature of one or more of the fluid streams exiting the stack. In practice, measurements such as these may be used to provide or infer a representative or approximate value for the stack operating temperature.

The temperature threshold at which flow of coolant is commenced is preferably greater than about 0° C., but may be below the typical desired operating temperature range of the fuel cell stack. For example, the threshold could be in the range of about 30° C. to 50° C., or the threshold may be within the desired operating temperature range, which for a solid polymer fuel cell is typically about 75° C. to 85° C. Once the desired operating temperature range is reached, conventional temperature regulation techniques may be used thereafter to keep the fuel cell stack operating within the desired temperature range.

This method is especially useful for commencing operation when at least a portion of the membrane electrode assembly has a temperature below the freezing temperature of water.

In an improvement upon the foregoing method, the predetermined temperature threshold at which flow of coolant is commenced is higher than the normal desired operating temperature of the stack. For example, it is preferably at least about 10° C. above the normal desired operating temperature of the stack. For a typical solid polymer fuel cell the preferred operating temperature range may be, for example, about 75° C. to 85° C. In this embodiment of the method, flow of coolant could be delayed until the operating temperature reaches a value in the range of about 95° C. to 105° C.

This in situ "heat treatment" of a membrane electrode assembly after a cold start has been shown, in certain situations, to improve subsequent fuel cell performance of a fuel cell, relative to commencing operation without operating the cell above its normal operating temperature range. Again, this improved method is especially useful for commencing operation when at least a portion of the membrane electrode assembly has temperature below the freezing temperature of water, and particularly operation on air (rather than a substantially pure oxidant). Operationally, the in situ heat treatment method can be accomplished in a number of other ways, besides delaying flow of a coolant.

Thus, a second method of commencing operation of an electric power generation system includes a period in which the stack is operated above its normal operating temperature. The system comprises a fuel cell stack connectable to an external electrical circuit for supplying electric current to the external circuit. The stack comprises at least one fuel cell, the at least one fuel cell comprising a membrane electrode assembly comprising an anode, a cathode, and an ion exchange membrane interposed between the anode and the cathode. The system further comprises a fuel stream and an oxidant stream, each of the streams being flowable to the fuel cell stack. The system optionally further comprises a coolant fluid stream flowable in thermal contact with the fuel cell stack. The method comprises:

supplying electric current from the fuel cell stack to the external circuit such that the temperature of the at least one fuel cell increases to a temperature above the normal operating temperature range of the stack; and reducing the operating temperature of the stack to with the normal operating temperature range.

The temperature above the normal operating temperature is typically predetermined. In preferred embodiments of the method, the fuel cell stack is temporarily operated at least about 10° C. above its normal desired operating temperature. For a typical solid polymer fuel cell the preferred operating temperature range may be, for example, about 75° C. to 85° C., so that stack may preferably be operated at a value in the range of about 95° C. to 105° C. for some period before operation in the range about 75° C. to 85° C. is resumed. The duration for which the stack is operated at the higher temperature may be variable, or it may be for a predetermined duration. For example, the stack may be operated at the higher temperature for about 1–2 minutes or for a few seconds. However, either or both of the temperature and duration of the higher temperature operation phase may be adjusted in response to some monitored operational parameter of the fuel cell system. For example, the preferred temperature and/or duration may depend on the temperature of the surrounding environment, the moisture conditions within the stack, a parameter indicative of reactant quality or purity, for how long the stack was stored at a low temperature, or an electrical parameter indicative of fuel cell performance.

As an alternative to the above heat treatment method, there may be some advantages to heating a fuel cell from below the freezing point of water to above its normal operating temperature range prior to commencing operation thereof. For example, an externally powered heater could be used to heat the stack or to heat a coolant circulated through the stack, or a hot fluid stream from elsewhere in the system could be used. Preferably as gas stream is circulated through one or both of the reactant stream passages during the heat treatment.

The methods described above for ceasing and commencing operation of a fuel cell may be used together or separately. In any of the above methods the exothermic operation of the stack tends to raise the operating temperature of the stack. However, other means may be used, in addition, to accelerate or facilitate the increase in temperature to within or beyond the desired stack operating temperature range.

DETAILED DESCRIPTION OF THE PREFERRED EMBODIMENTS

Figure 1:
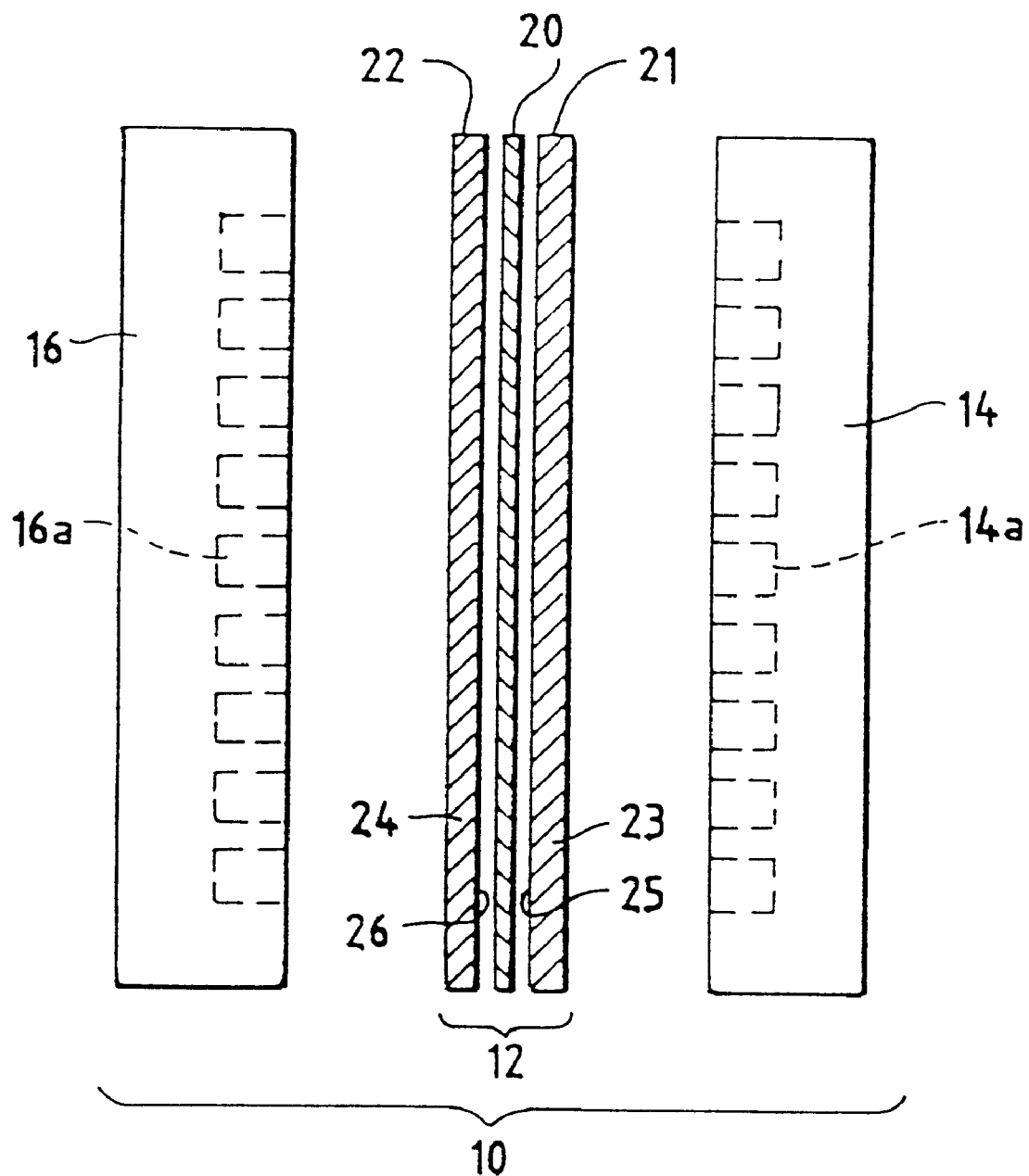
FIG. 1 is an exploded side view of a typical solid polymer electrochemical fuel cell with a membrane electrode assembly interposed between two fluid flow field plates.

FIG. 1 illustrates a typical fuel cell 10. Fuel cell 10 includes a membrane electrode assembly 12 interposed between anode flow field plate 14 and cathode flow field plate 16. Membrane electrode assembly 12 consists of an ion exchange membrane 20 interposed between two electrodes, namely, anode 21 and cathode 22. In conventional fuel cells, anode 21 and cathode 22 comprise a substrate of porous electrically conductive sheet material 23 and 24, respectively, for example, carbon fiber paper or carbon cloth. Each substrate has a thin layer of electrocatalyst 25 and 26, respectively, disposed on one surface thereof at the interface with membrane 20 to render each electrode electrochemically active.

As further shown in FIG. 1, anode flow field plate 14 has at least one fuel flow channel 14a engraved, milled or molded in its surface facing anode 21. Similarly, cathode separator plate 16 has at least one oxidant flow channel 16a engraved, milled or molded in its surface facing cathode 22. When assembled against the cooperating surfaces of electrodes 21 and 22, channels 14a and 16a form the reactant flow field passages for the fuel and oxidant, respectively. The flow field plates are electrically conductive.

Figure 2:
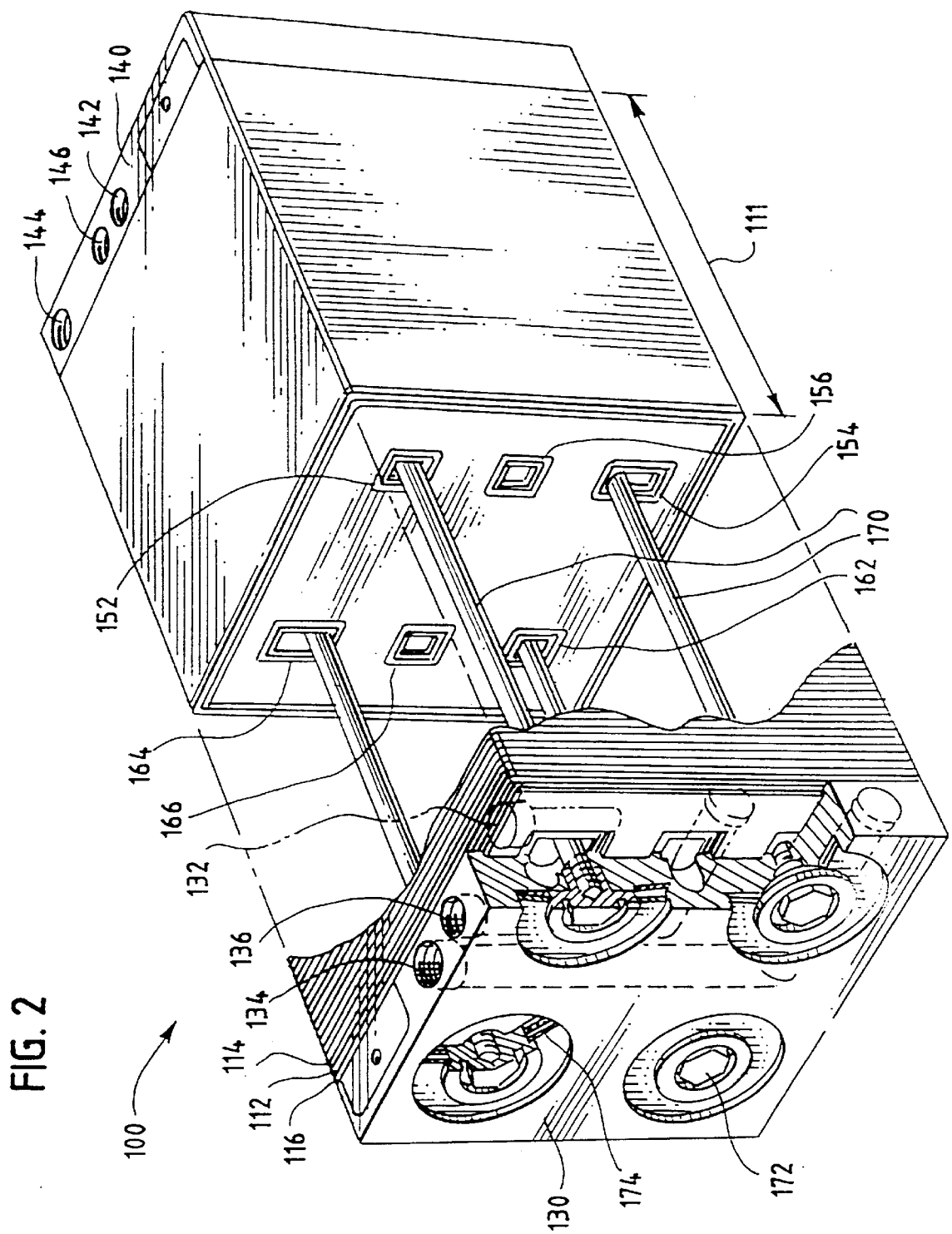
FIG. 2 is a perspective cut-away view of an electrochemical fuel cell stack.

Turning now to FIG. 2, a fuel cell stack 100 includes a plurality of fuel cell assemblies, a series of which is designated as 111 in FIG. 2. Each of the fuel cell assemblies includes a membrane electrode assembly 112 interposed between a pair of fluid flow field plates 114, 116. Fuel cell stack 100 also includes a first end plate 130 and a second end plate 140.

Plate 130 includes fluid inlet ports 132, 134, 136 for introducing fluid fuel, oxidant and coolant streams, respectively, to the stack. Plate 140 includes fluid outlet ports 142, 144, 146 for exhausting fluid fuel, oxidant and coolant streams, respectively, from the stack. The fluid outlet ports are fluidly connected to the corresponding fluid inlet ports via passages within the stack.

The fuel cell assemblies have a series of openings formed therein, which cooperate with corresponding openings in adjacent assemblies to form fluid manifolds 152, 154, 156, 162, 164, 166 within the stack 100. The fluid manifolds are each circumscribed by a sealant material or gasket. In addition, a peripheral seal at the exterior perimeter of each fuel cell fluidly isolates the interior, electrochemically active portion of the fuel cell from the external environment.

A fuel stream entering the stack via fuel inlet port 132 is directed to the individual fuel flow field plates via manifold 152. After passing through the fuel flow field plate channels, the fuel stream is collected in manifold 162 and exhausted from the stack via fuel outlet port 142. Similarly, an oxidant stream entering the stack via oxidant inlet port 134 is directed to individual oxidant flow field plates via manifold 154. After passing through the oxidant flow field plate channels, the oxidant stream is collected in manifold 164 and exhausted from the stack via oxidant outlet port 144. A fluid coolant (typically water) introduced via coolant inlet port 136 is directed to coolant plate assemblies (not shown) in the stack 100 via manifold 156. The coolant stream is collected in manifold 166 and exhausted from the stack via coolant outlet port 146. Coolant manifolds 156, 166 may be fitted with compliant means (not shown), such as tube cushions or inserts made of closed cell foam, to accommodate the expansion of freezing water. Tie rods 170 extend between end plates 130 and 140 to compress and secure stack 100 in its assembled state with fastening nuts 172 disposed at opposite ends of each tie rod, and disc springs 174 interposed between the fastening nuts 172 and end plates 130, 140.

Figure 3:
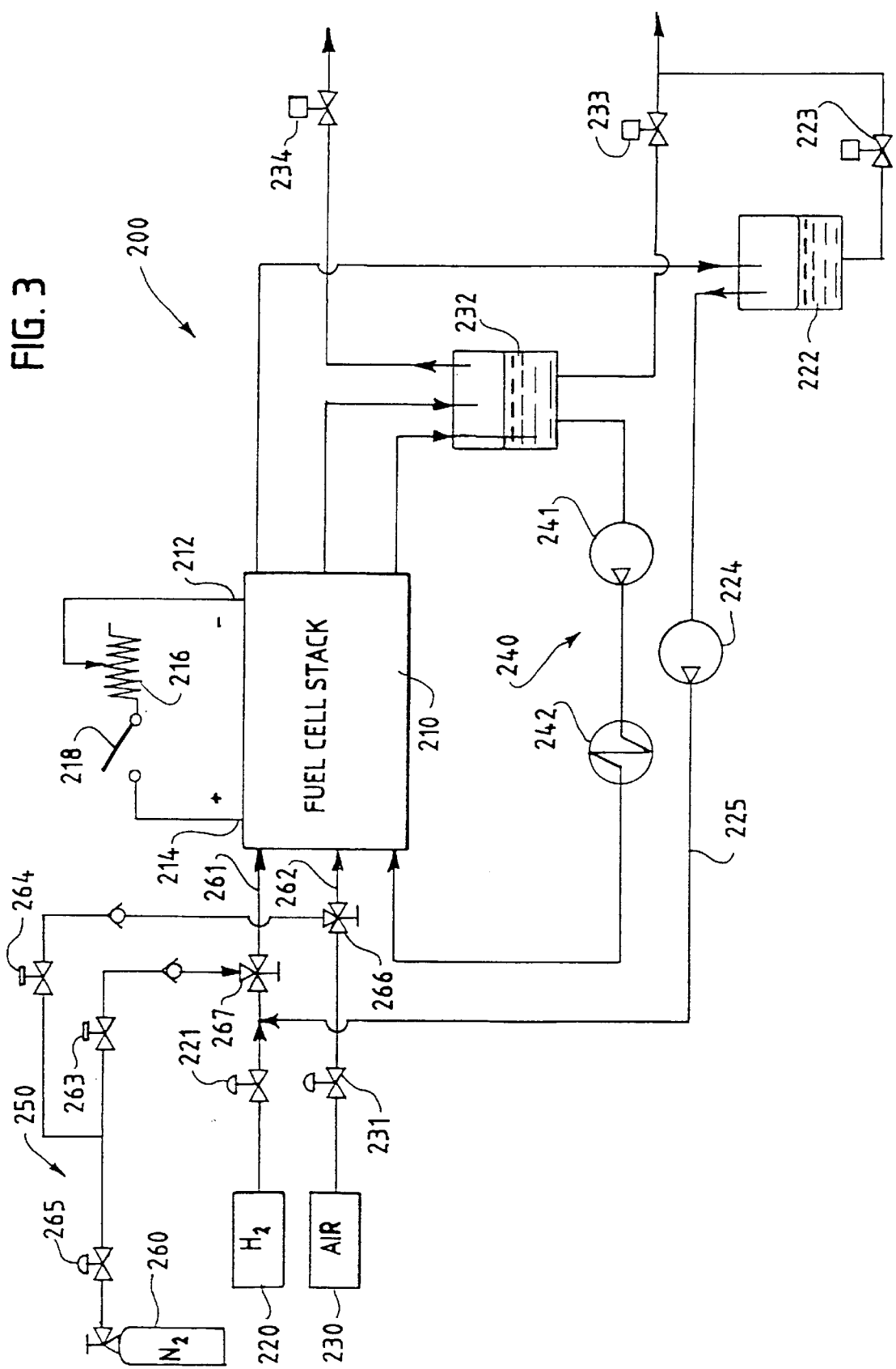
FIG. 3 is a schematic diagram of a fuel cell electric power generation system.

FIG. 3 is a schematic diagram of a fuel cell electric power generation system 200 comprising a fuel cell stack 210. The fuel cell stack 210 includes negative and positive bus plates 212, 214, respectively, to which an external circuit comprising a variable load 216 is electrically connectable by closing switch 218. The system includes a fuel (hydrogen) circuit, an oxidant (air) circuit, and a coolant water circuit. The reactant and coolant streams are circulated in the system in various conduits illustrated schematically in FIG. 3.

A hydrogen supply 220 is connected to the stack 210, and the pressure is controlled by pressure regulator 221. Water in the hydrogen stream exiting the stack 210 is accumulated in a knock drum 222, which can be drained by opening valve 223. Unreacted hydrogen is recirculated to stack 210 by a pump 224 in recirculation loop 225. An air supply 230 is connected to the stack 210, the pressure of which is controlled by pressure regulator 231. Water in the air stream exiting the stack 210 is accumulated in reservoir 232, which can be drained by opening valve 233, and the air stream is vented from the system via valve 234.

In the coolant water loop 240, water is pumped from reservoir 232 and circulated through stack 210 by pump 241. The temperature of the water is adjusted in a heat exchanger 242.

A purge system 250 is used to purge the hydrogen and oxidant passages in fuel cell stack 210 with low humidity, non-reactive gas. Flow of gas (dry nitrogen) from a purge gas supply 260 to the hydrogen and air inlet conduits 261, 262 is controlled by valves 263, 264 and three-way valves 266, 267. The nitrogen pressure is controlled by pressure regulator 265.

Figure 4:
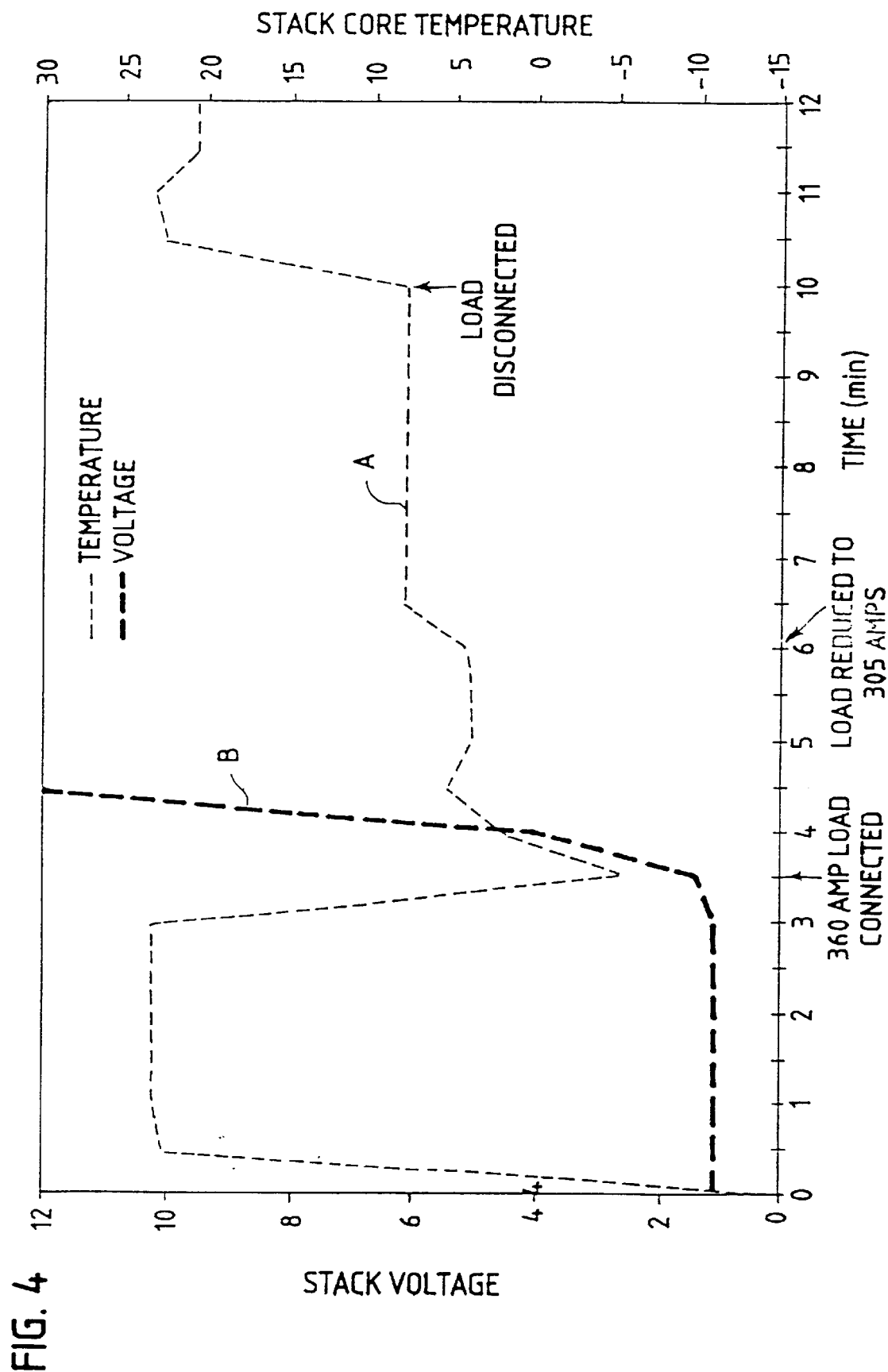
FIG. 4 is a composite plot of fuel cell stack voltage versus time in minutes (plot A) and fuel cell stack core temperature versus time in minutes (plot B) for a 10-cell stack, operation of which was commenced after the stack had equilibrated at a core temperature of −11° C.

FIG. 4 is a composite plot of fuel cell stack voltage versus time in minutes (plot A) and fuel cell stack core temperature versus time in minutes (plot B) for a 10-cell stack to which the flow of fuel and oxidant was restored after the stack had equilibrated at a core temperature of −11° C.

The stack had been operating previously, and therefore the reactant flow passages contained moist gases. Before decreasing the stack core temperature below the freezing temperature of water, the reactant and coolant water passages within the stack were purged by circulating dry, compressed air through them. The stack core temperature was then lowered below the freezing temperature of water by exposing the stack to a surrounding environment with a temperature below the freezing temperature of water. For the purposes of the examples described herein, the stack was typically placed in an insulated chamber, with the fluid and electrical connections to the stack fitted through the chamber walls. Cold nitrogen gas from a liquid nitrogen source was circulated through the chamber. The stack core temperature was measured using a thermocouple positioned in a thermally conductive plate located between two fuel cells in the center of the stack. Stack voltage, stack current and ambient temperature were also monitored.

When circulation of hydrogen and air through the stack was commenced at a stack core temperature of −11° C.(at time=0 minutes), the open circuit voltage was normal. A load (360 amp) was connected in the circuit after approximately three minutes, causing the stack core temperature to rise rapidly while the voltage decreased but recovered gradually. Once operation of the stack had commenced, the exothermic reaction of hydrogen and oxygen within the stack and the resistive heating due to internal ohmic losses caused the stack core temperature to rise.

Figure 5:
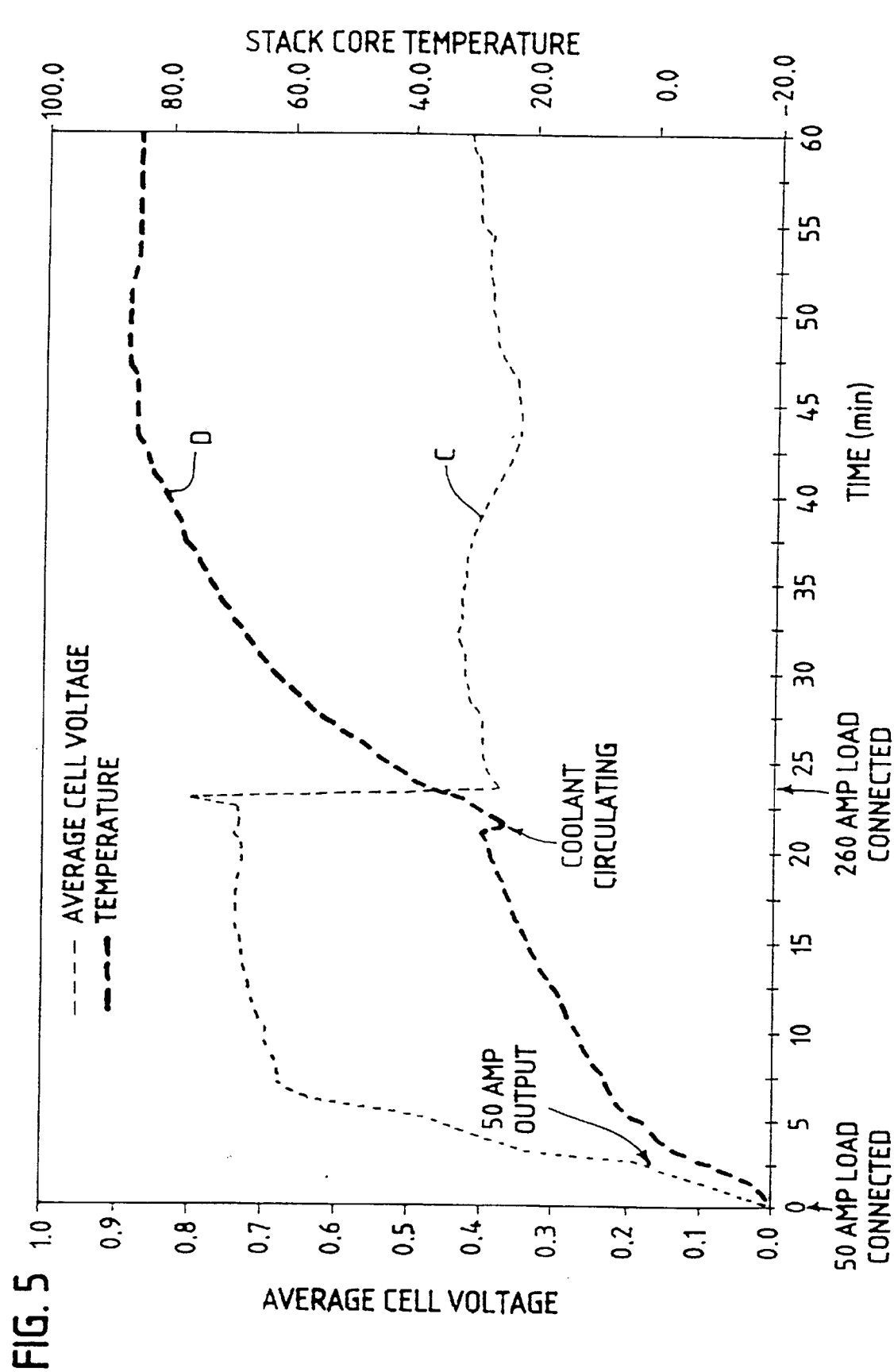
FIG. 5 is a composite plot of fuel cell stack voltage versus time in minutes (plot C) and fuel cell stack core temperature versus time in minutes (plot D) for a 4-cell stack, operation of which was commenced at a core temperature of −19° C.

FIG. 5 is a composite plot of fuel cell stack voltage versus time in minutes (plot C) and fuel cell stack core temperature versus time in minutes (plot D) for a 4-cell stack, operation of which was commenced at a core temperature of −19° C.

Again, as the stack had been operating previously, before decreasing the stack core temperature to −19° C., the reactant passages within the stack were purged by circulating dry, nitrogen. Coolant water remained in the coolant passages. Preferably the purge fluid is an inert gas such as nitrogen. Circulation of hydrogen and air was commenced with a load (50 amp) connected. Approximately 2 minutes transpired before the output current reached 50 amps. The load was increased to 260 amps once the stack reached about 30° C., and the coolant pump was then activated. One cell in the stack was not operating properly; hence the lower than normal average cell voltages.

During commencement of stack operation, it has been found advantageous to refrain from circulating the fluid coolant stream within the stack until the stack has reached a temperature above the freezing temperature of water. More preferably, the fluid coolant stream is not circulated until the stack has reached a temperature at or near the desired stack operating temperature. In this regard, the circulating fluid coolant stream, assuming it is not pre-heated, will absorb and carry away heat otherwise available to warm the stack. Refraining from circulating the fluid coolant stream therefore expedites the warming of the stack to its desired operating temperature.

The cold start capability and freeze tolerance of fuel cells can be improved by reducing the amount of water remaining within the passages of the stack upon cessation of operation and reduction of stack core temperature to near or below the freezing temperature of water. As used herein, "freeze tolerance" refers to the ability of a fuel cell or fuel cell stack to maintain substantially the same performance after one or more freeze/thaw cycles.

The reactant passages, including the manifolds and individual fuel cell reactant flow passages within a fuel cell stack, are preferably purged with a fluid stream before the temperature of the stack is decreased to below the freezing temperature of water. Preferably a fluid which is not reactive in the fuel cell environment, such as nitrogen gas, is used. A liquid may be used as the purge fluid. Preferably it would be a liquid that does not freeze at the temperature to which the fuel cell is to be exposed, and which has no detrimental effect on the fuel cell components. Alternatively, the reactant streams themselves can be employed as the purge streams. Preferably the purge fluid, if it is a gas, is dry or at least not humidified. Thus, when employing the reactant streams as the purge streams, reactant stream humidifiers (if any) should be bypassed to provide streams having water carrying capacity greater than humidified reactant streams. The greater water carrying capacity of unhumidified reactant purge streams will result in more effective absorption and removal of water from the reactant stream conduits and porous components of the stack. Although all the reactant and coolant passages may be desirably purged in some situations, it has also been found effective in many cases to purge the oxidant stream passages only. This can simplify the system and the shutdown sequence.

It has been found that improved cold start capability and freeze tolerance of fuel cells to multiple freeze/thaw cycles can also be achieved when one or more of the fuel, oxidant, coolant and humidification passages are purged after the stack core temperature has been reduced to at or below normal room temperature (hereinafter referred to as "cold purging"). The beneficial effect of purging is not quite so pronounced when the stack passages are purged at a temperature within the normal stack operating temperature range (hereinafter referred to as "hot purging").

Examples—Purge Methods
Experimental Details

The effect of cold and hot purging on membrane electrode assemblies having two different membrane types, Nafion® 1135 and a DowPont™ membrane, in a Ballard Mark 513 single fuel cell with an internal humidifier was investigated. Separate water feed lines for the coolant and humidification streams were employed. The coolant outlet temperature was 85° C. with a ΔT (change in temperature from inlet to outlet) of 10° C. at 1000 ASF (10764 ASM), using air as the oxidant. Both MEAs had a screen printed anode containing 3.87 mg/cm$^2$ platinum black electrocatalyst on carbon fiber paper. For the cathode, both MEAs had 3.87 mg/cm$^2$ platinum black electrocatalyst applied by hand to carbon fiber paper. The Nafion® 1135 membrane employed in MEA No. 513-15 had an equivalent weight of 1100 and a thickness of about 85 μm (dry). The DowPont™ membrane employed in MEA No. 513-22 had an equivalent weight of 800 and a thickness of about 100 μm (wet).

The Mark 513 cell was assembled and run overnight at 600 ASF (6458 ASM) at an air/fuel pressure of 30/30 psig (207/207 kPa gauge) and a stoichiometry of 2/1.5 respectively. The fuel was substantially pure hydrogen. "Stoichiometry" is the ratio of the amount of reactant supplied to the fuel cell stack to the amount of reactant actually consumed in the fuel cell stack. In this instance, a fuel stoichiometry of 1.5 means that 150 parts of hydrogen are supplied to the fuel cell for each 100 parts actually consumed in the fuel cell.

Cold Purae Freeze/Thaw Cycles

For the initial series of three freeze/thaw cycles (results shown in FIGS. 6 and 7), the cell was cooled from its normal operating temperature (approximately 85° C.) to room temperature (approximately 23° C.) before purging. In each case, the fuel, oxidant, coolant and humidification passages were purged for approximately 7 minutes with nitrogen. The cell containing the Nafion® 1135 membrane was taken through a fourth freeze/thaw cycle with a purge duration of only approximately 1 minute (results shown in FIG. 8). The cell inlets and outlets were capped and the cell was placed in a freezer. Internal sealing pressure within the cell was maintained during freezing. The freezer temperature was approximately −20° C. The duration of the freeze ranged from 15–20 hours. After removal from the freezer, the coolant lines were connected and the cell was heated to 50° C. At that point, operation of the fuel cell was commenced at 50 ASF (538.2 ASM) with excess fuel and oxidant flow rates. When the cell temperature reached 60° C., the current density was increased to 600 ASF (6458 ASM) and the cell was operated for at least one hour or until cell voltage had stabilized. A polarization test from 0 to 1000 ASF (0 to 10764 ASM) was performed for each of the two MEAs tested, using two different oxidant streams: air and substantially pure oxygen.

Figure 6:
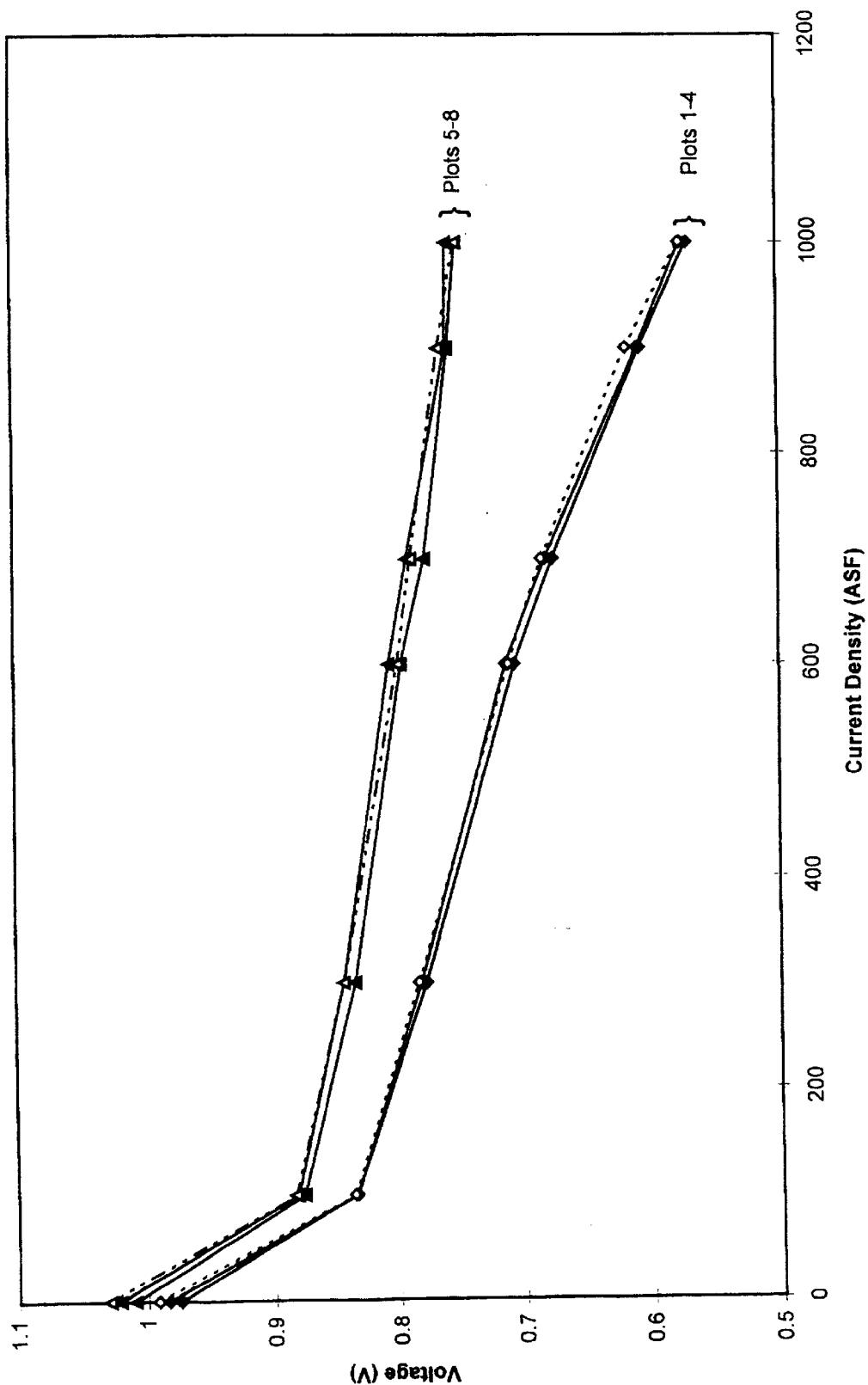
FIG. 6 is a plot of voltage as a function of current density for a fuel cell containing a membrane electrode assembly with a DowPont™ membrane exposed to three cold purge freeze/thaw cycles.

FIG. 6 is a plot of voltage as a function of current density for the fuel cell containing MEA 513-22 (DowPont™ membrane). Plots 1–4 show the performance on air prior to freezing (which is the plot with the solid line and solid data points ◆), and after each of the three cold purge freeze/thaw cycles described above. Plots 5–8 show the performance on oxygen prior to freezing (which is the plot with the solid line and solid data points ▲), and after each of the three cold purge freeze/thaw cycles described above. For each of the oxidant streams, the four plots in FIG. 6 are difficult to distinguish from one another.

Figure 7:
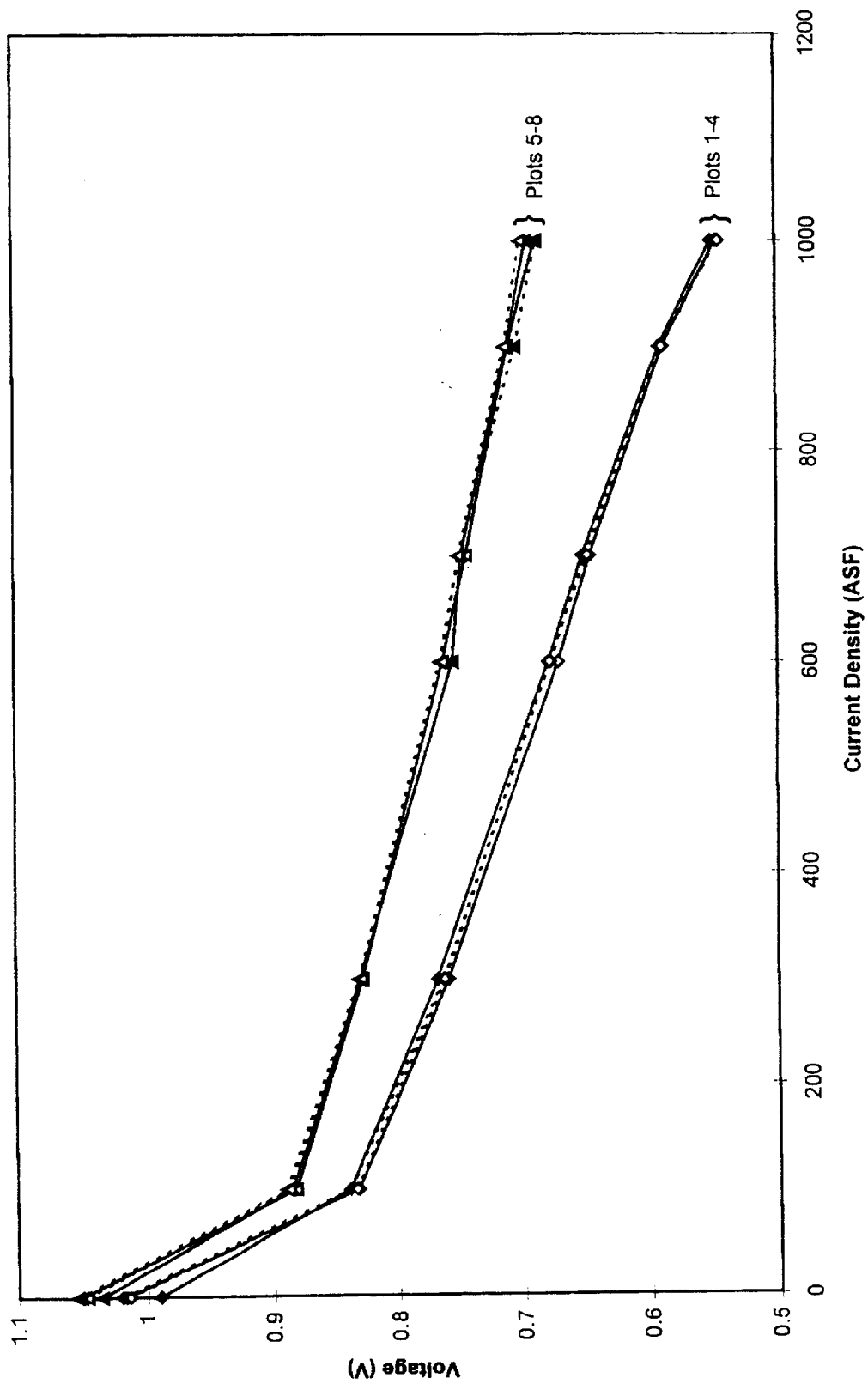
FIG. 7 is a plot of voltage as a function of current density for the fuel cell containing a membrane electrode assembly with a Nafion™ 1135 membrane exposed to three cold purge freeze/thaw cycles.

FIG. 7 is a plot of voltage as a function of current density for the fuel cell containing MEA 513-12 (Nation® 1135 membrane). Plots 1–4 show the performance on air prior to freezing (which is the plot with the solid line and solid data points ◆), and after each of the three cold purge freeze/thaw cycles described above. Plots 5–8 show the performance on oxygen prior to freezing (which is the plot with the solid line and solid data points ▲), and after each of the three cold purge freeze/thaw cycles described above. Again, for each of the oxidant streams, the four plots in FIG. 7 are difficult to distinguish from one another.

Figure 8:
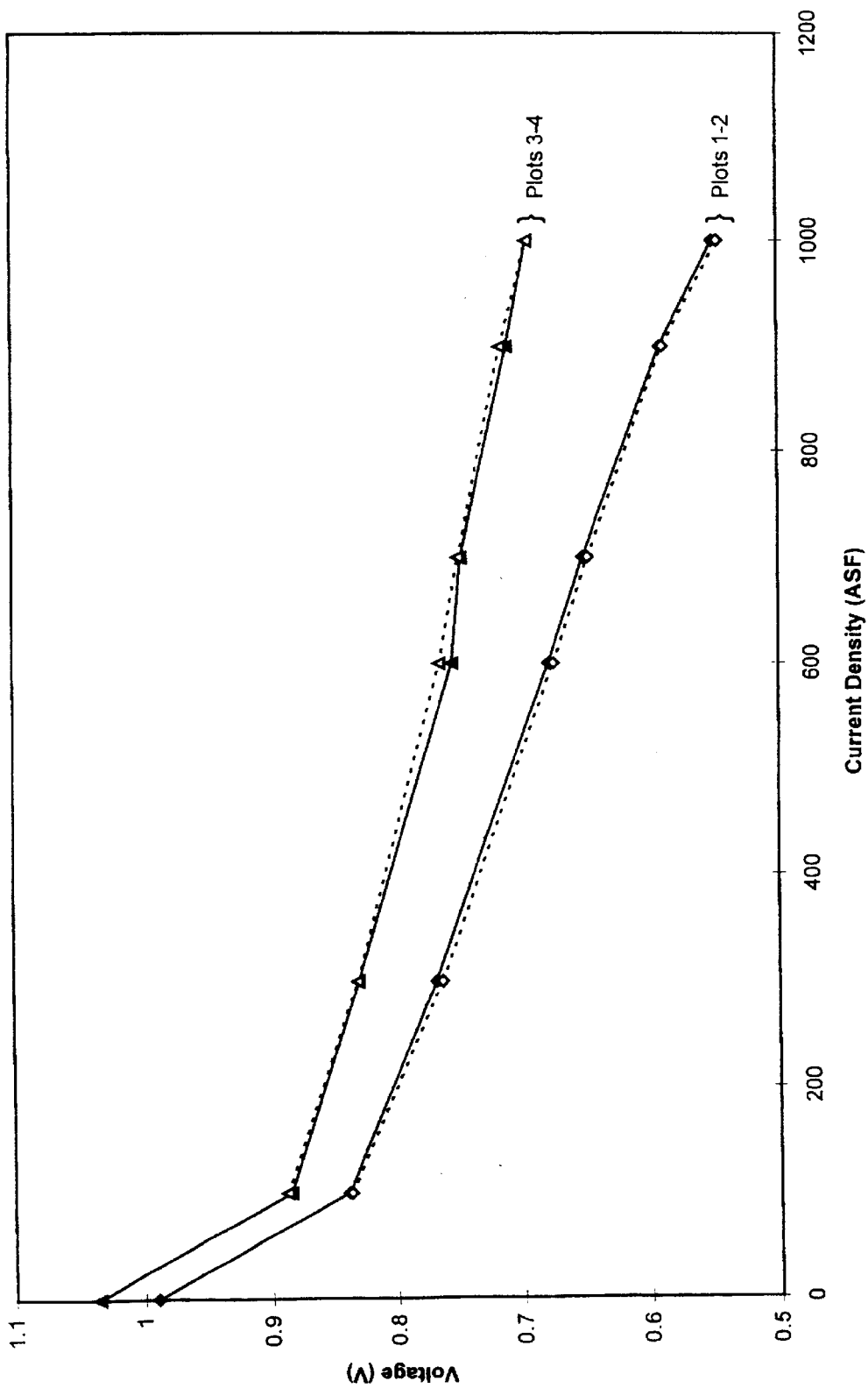
FIG. 8 is a plot of voltage as a function of current density for a fuel cell containing a membrane electrode assembly with a Nafion® 1135 membrane exposed-to one shorter duration cold purge freeze/thaw cycle.

FIG. 8 is a plot of voltage as a function of current density for the fuel cell containing MEA 513-12 (Nafion® 1135 membrane). Plots 1–2 show the performance on air prior to freezing (which is the plot with the solid line and solid data points ◆), and after the fourth cold purge freeze/thaw cycle described above, in which a shorter purge duration (approximately 1 minute) was used. Plots 3–4 show the performance on oxygen prior to freezing (which is the plot with the solid line and solid data points ▲), and after the fourth cold purge freeze/thaw cycle described above. Again, for each of the oxidant streams, the two plots in FIG. 8 are difficult to distinguish from one another, indicating that a shorter duration purge can give satisfactory results.

Thus, based on the results shown in FIGS. 6, 7 and 8, for both MEAs, substantially no mass transport losses were exhibited over the series of three or four freeze/thaw cycles. The performance after each freeze/thaw cycle was maintained at approximately baseline (prior to freezing) polarization levels. Both MEAs thus exhibited favorable freeze/thaw tolerance when the cold purging technique was used.

Hot Purge Freeze/Thaw Cycles

For a subsequent series of three freeze/thaw cycles, each cell was purged at stack operating temperature (approximately 85° C.) before cooling. The fuel, oxidant, coolant and humidification passages were purged for approximately 1 minute with nitrogen. The cell inlets and outlets were capped and the cell was placed in a freezer. Internal sealing pressure within the cell was maintained during freezing. The freezer temperature was approximately −20° C. The duration of the freeze ranged from 15–20 hours. After removal from the freezer, the coolant lines were connected and the cell was heated to operating temperature and operation commenced using essentially the same procedure employed for the cold purge freeze/thaw cycles described above. A polarization test from 0 to 1000 ASF (0 to 10764 ASM) was performed for each of the two MEAs tested, again using two different oxidant streams: air and substantially pure-oxygen.

Figure 9:
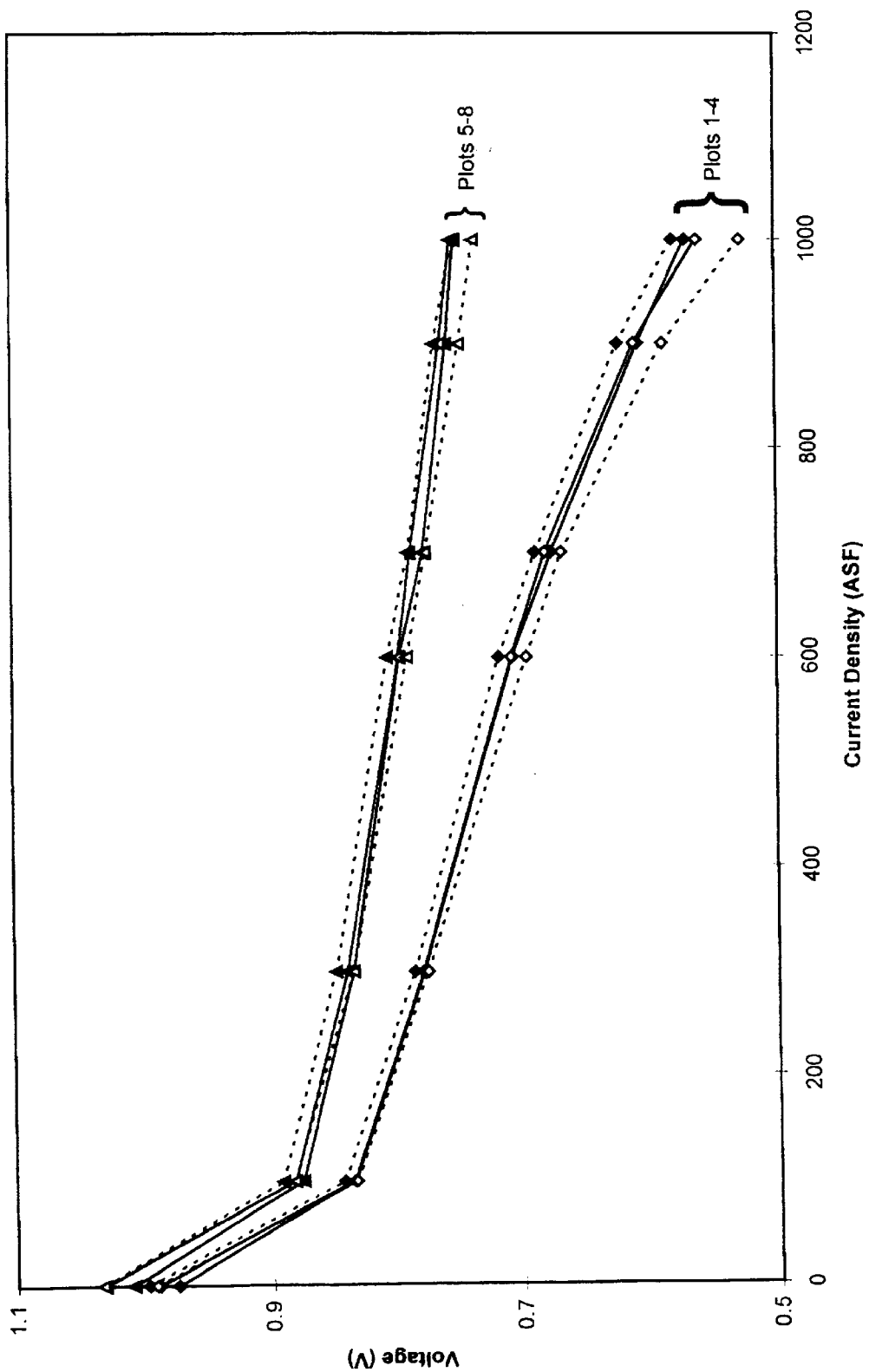
FIG. 9 is a plot of voltage as a function of current density for a fuel cell containing a membrane electrode assembly with a DowPont™ membrane exposed to three hot purge freeze/thaw cycles.

FIG. 9 is a plot of voltage as a function of current density for the fuel cell containing MEA 513-22 (DowPont™ membrane). Plots 1–4 show the performance on air prior to freezing (which is the plot with the solid line and solid data points ◆), and after each of the three hot purge freeze/thaw cycles described above. Plots 5–8 show the performance on oxygen prior to freezing (which is the plot with the solid line and solid data points ▲), and after each of the three hot purge freeze/thaw cycles described above. A significant mass transport effect appears to occur at higher current densities on air after the third freeze cycle, based on the increased difference between the air and oxygen performance levels.

Figure 10:
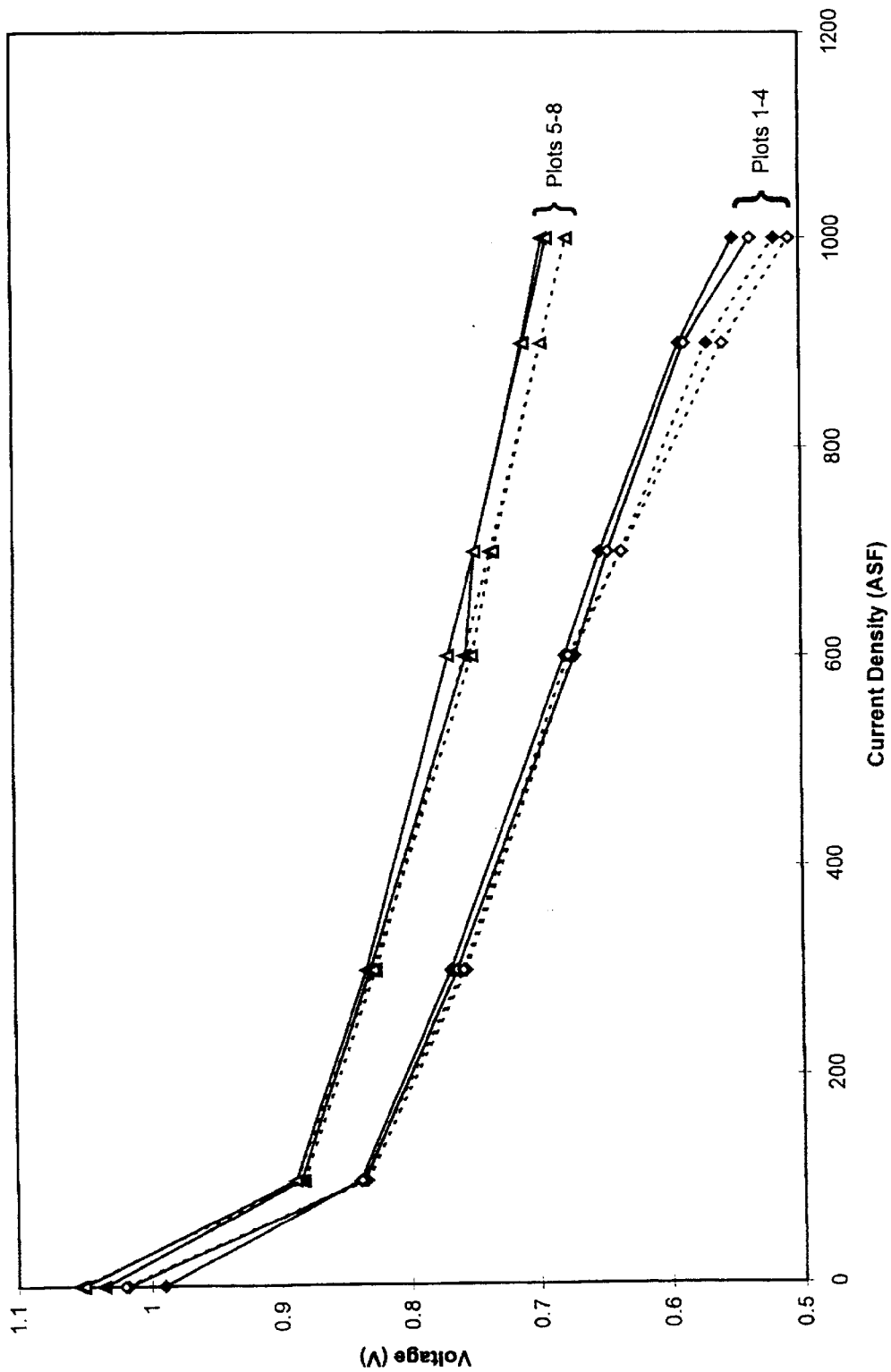
FIG. 10 is a plot of voltage as a function of current density for the fuel cell containing a membrane electrode assembly with a Nafion™ 1135 membrane exposed to three hot purge freeze/thaw cycles.

FIG. 10 is a plot of voltage as a function of current density for the fuel cell containing MEA 513-12 (Nafion® 1135 membrane. Plots 1–4 show the performance on air prior to freezing (which is the plot with the solid line and solid data points ◆), and after each of the three hot purge freeze/thaw cycles described above. Plots 5–8 show the performance on oxygen prior to freezing (which is the plot with the solid line and solid data points ▲), and after each of the three hot purge freeze/thaw cycles described above. Again, a significant mass transport effect appears to occur at higher current densities on air, based on the progressively increasing difference between the air and oxygen performance levels after each freeze/thaw cycle.

The particularly favorable results obtained with the cold purge technique were further supported by the following test in which a single fuel cell was cycled through 55 freeze/thaw cycles, with the purge technique used on the coolant and cathode side passages only.

Experimental Details

The effect of repeated cold purging on a membrane electrode assembly having a Nafione® 112 membrane, in a Ballard Mark 513 single fuel cell with an external humidifier was investigated. Separate water feed lines for the coolant and humidification streams were employed. The coolant inlet temperature was 70° C. with a $\Delta T$ (change in temperature from inlet to outlet) of 15° C. at 1 A/cm$^2$ using air as the oxidant. The MEA had a screen printed anode containing 0.34–0.38 mg/cm$^2$ platinum black electrocatalyst and a screen printed cathode containing 0.73–0.82 mg/cm$^2$ platinum black electrocatalyst on carbon fiber paper, both with a Nafion spray coating (0.2 mg/cm$^2$).

The cell was tested in a temperature-controlled environmental chamber at an air/fuel pressure of 27/27 psig (186/186 kpa gauge) and a stoichiometry of 1.8/1.2 respectively. The fuel was a simulated methanol reformate stream (composition 63.5% hydrogen; 22.5% carbon dioxide; 13% nitrogen; 1% methanol and 40 ppm carbon monoxide), and a 4% air bleed was used at the anode. The fuel and oxidant streams were humidified.

For the series of 55 freeze/thaw cycles (results shown in FIG. 11), the cell was cooled from its normal operating temperature (approximately 80° C.) to a chamber temperature at which no part of the stack was below 0° C., but where the cell temperature was approximately 30° C. before purging. In each case, the oxidant passages were purged for approximately 10 seconds with dry (unhumidified) air. The cell inlets and outlets were closed by actuated valves, and the temperature in the chamber was reduced to approximately −25° C. The duration of each freeze was approximately 1 hour. Internal sealing pressure within the cell was maintained during freezing. The cell was then thawed to 5° C. and then heated, by circulating warm coolant, to 65° C. At that point, operation of the fuel cell was commenced at 0.5 A/cm$^2$ for 60 minutes, then at 1.0 A/cm$^2$ for 30 minutes, then for a second time at 0.5 A/cm$^2$ for 30 minutes.

Figure 11:
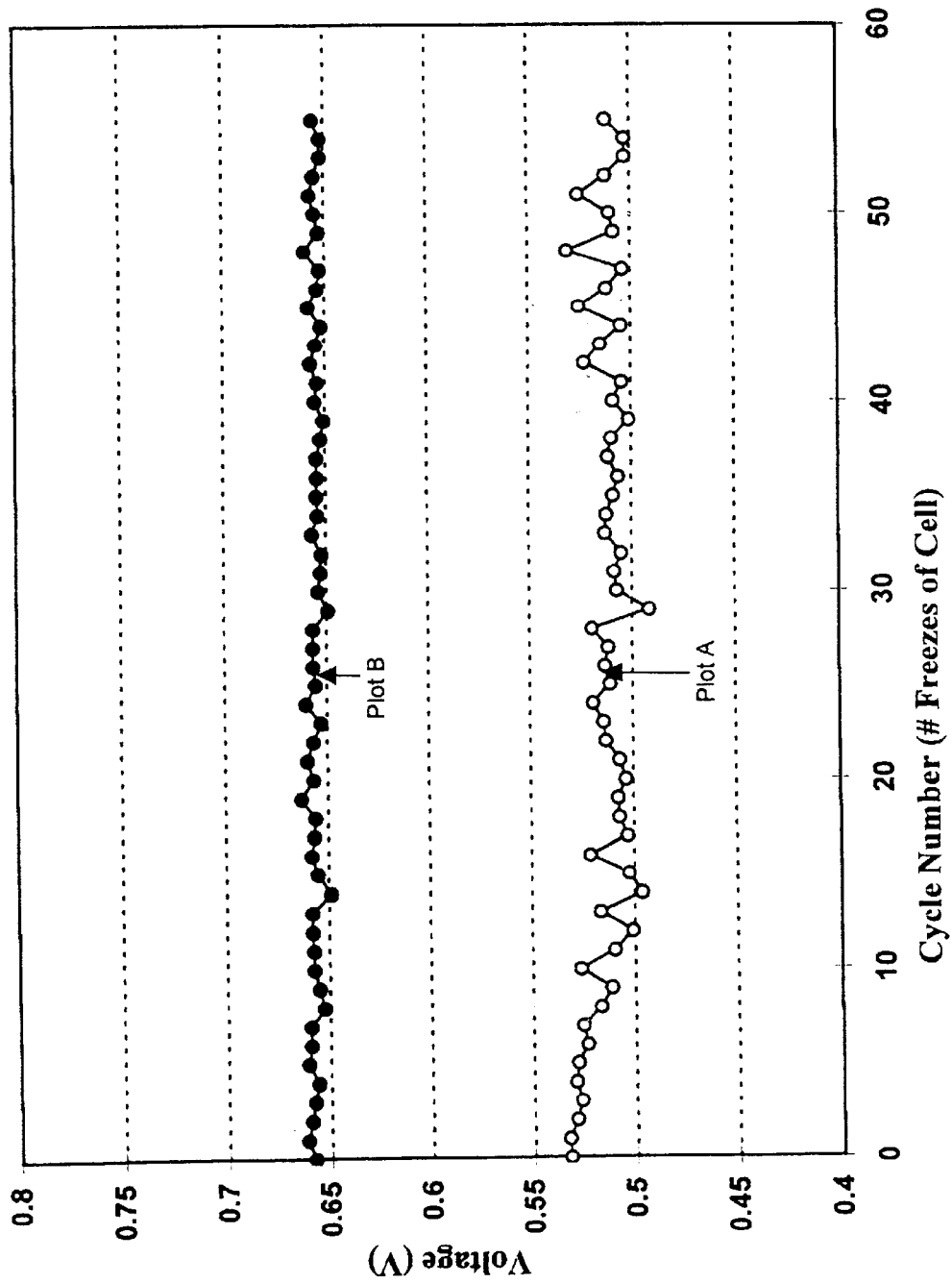
FIG. 11 is a plot of cell voltage, for the fuel cell containing a membrane electrode assembly with a Nafion® 112 membrane, after each of a series of 55 cold purge freeze/thaw-cycles.

FIG. 11 shows the results obtained after each of 55 such cycles with the cell voltage measured once it had stabilized at 1.0 A/cm$^2$ during the 30 minutes of operation at that current density (Plot A) and once it had stabilized at 0.5 A/cm$^2$ during the second period of operation at that current density (Plot B). At both current densities the performance degradation over the 55 cycles was negligible: approximately −0.1 mV/cycle at 0.5 A/cm$^2$ and approximately −0.2 mV/cycle at 1.0 A/cm$^2$.

Examples—Heat Treatment Methods

Figure 12:
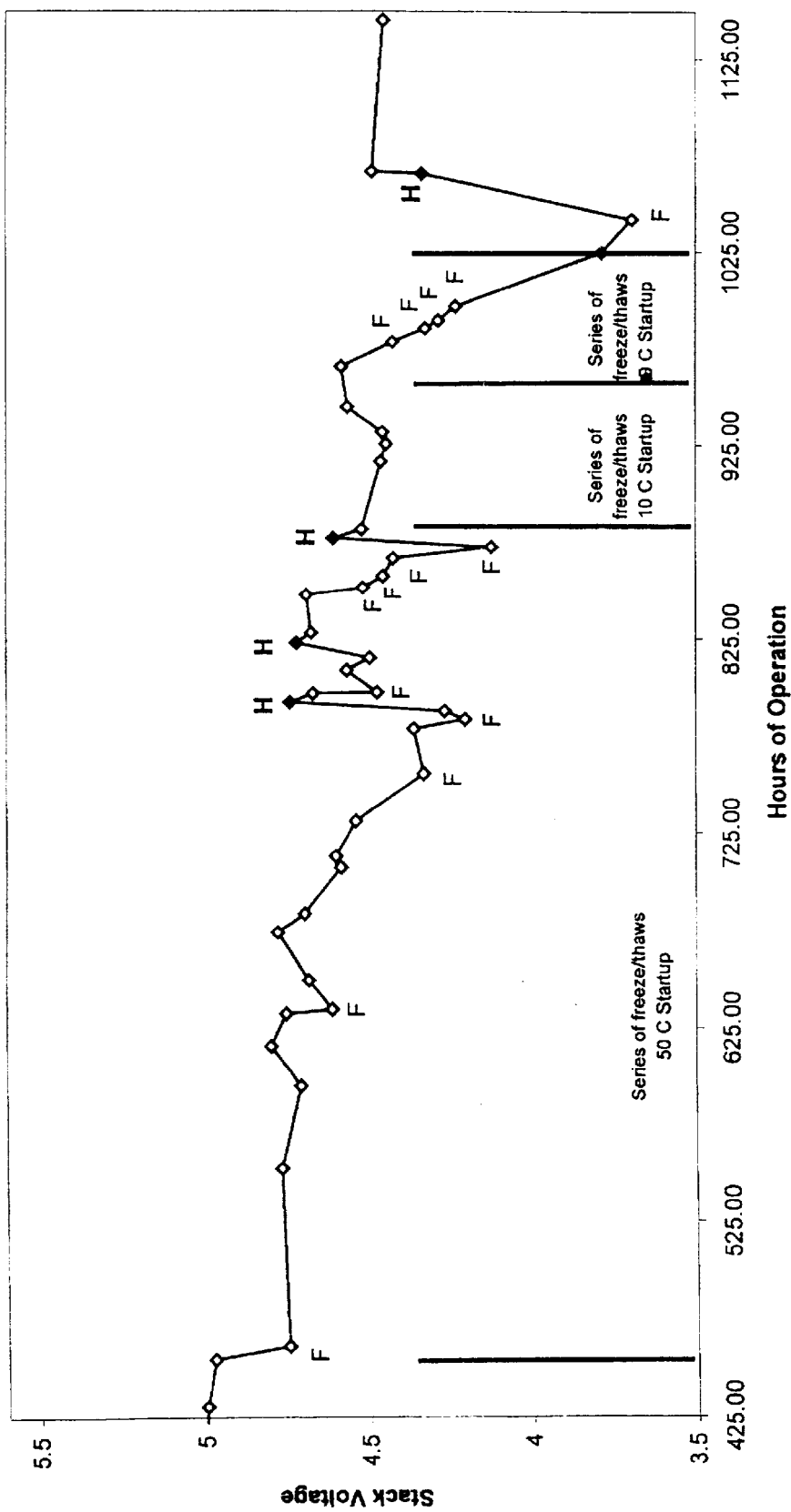
FIG. 12 is a plot of stack voltage against operating time for an 8-cell Ballard Mark 513 fuel cell stack which was subjected to a series of freeze-thaw-operation cycles, interspersed with four heat treatment cycles.

FIG. 12 shows a plot of stack voltage against operating time for an 8-cell Ballard Mark 513 fuel cell stack which was subjected to a series of freeze-thaw-operation cycles. Prior to freezing the fuel, oxidant and coolant passages were purged with dry gas. During the freezing cycles, the cell inlets and outlets were capped and the cell was placed in a freezer. Internal sealing pressure within the cell was maintained during freezing. The freezer temperature was approximately −20° C. The duration of the freeze in each case was greater than 12 hours. After some cycles the stack was operated normally, and after other cycles the stack operating temperature was increased to above its normal operating temperature for a period, before normal operation was resumed. The stack was operated on humidified air and hydrogen, both at 30 psig (207 kPa gauge), at stoichiometries of 2.0 and 1.5 respectively, at a current density of 700 ASF (7535 ASM) to generate the data shown in FIG. 12. The coolant inlet temperature was 75° C. with a ΔT (change in temperature from inlet to outlet) of 10° C. at 1000 ASF (10764 ASM).

Referring to FIG. 12, between 425 and 882 hours the stack was operated, frozen several times, and then started up having been warmed to 50° C. Data points obtained directly after a freeze cycle are marked F. It can be seen that the cell performance deteriorated after each freeze cycle. After 882 hours the stack was started up after freeze cycles having been warmed to only 10° C. After 950 hours the stack was started up after freeze cycles having been warmed to only 0° C. The performance losses observed did not appear to be significantly affected by the start temperature.

A substantial improvement in performance after freezing was obtained in 4 cases where stack operation was commenced and then the stack operating temperature was increased to above the normal stack operating temperature of about 85° C., namely, to approximately 100° C. Data points obtained directly after such heat treatments are marked H.

Figure 13:
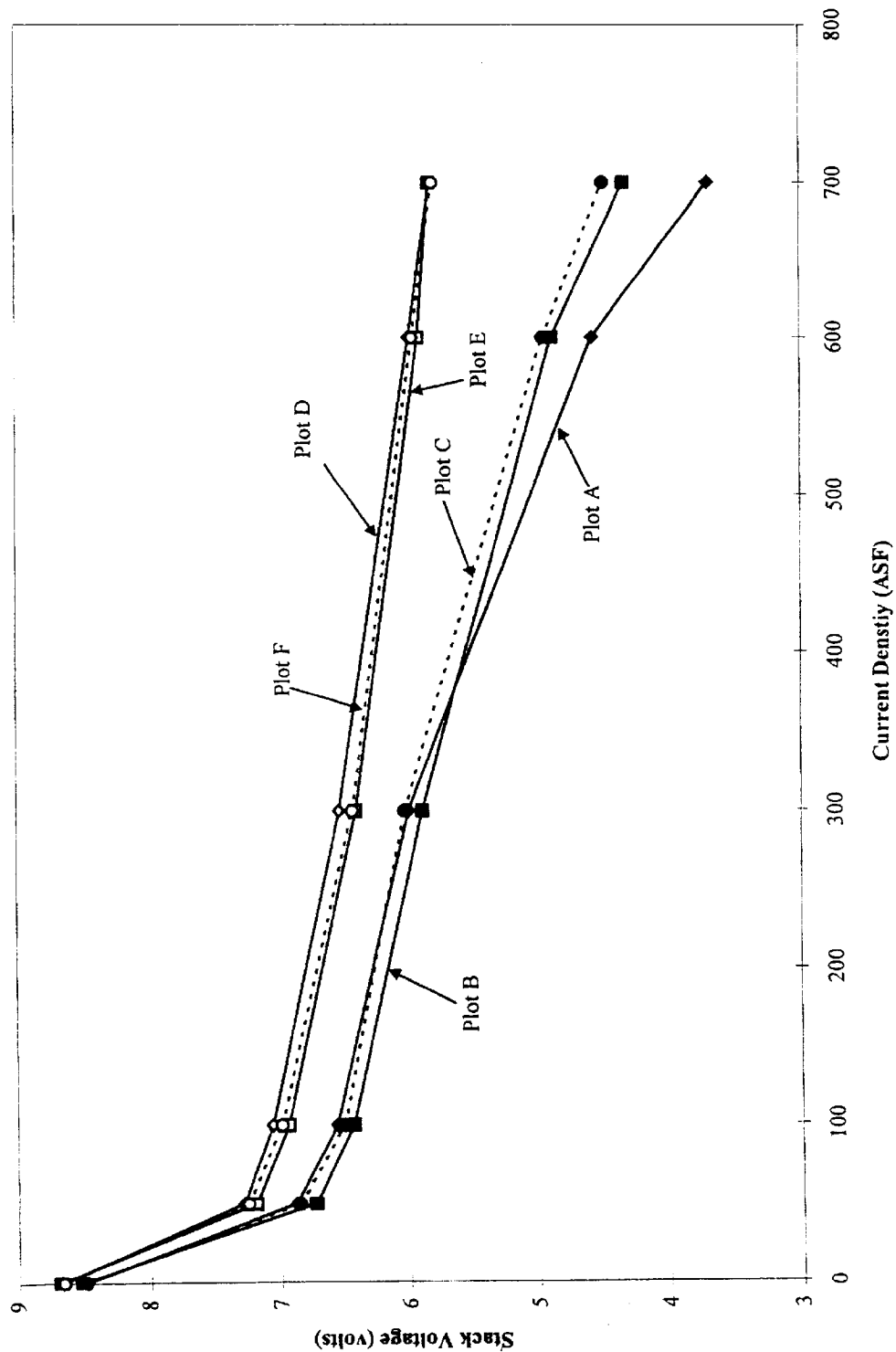
FIG. 13 is a plot of stack voltage against current density for the fuel cell stack used to generate the data of FIG. 12, before and after heat treatment

FIG. 13 shows a plot of stack voltage as a function of current density for the 8-cell Ballard Mark 513 fuel cell stack used to generate the data of FIG. 12. Plots A, B and C show performance curves for operation on air, and plots D, E and F for operation on oxygen. Plots A and D show the stack performance before any of the heat treatments referred to the description of FIG. 12 but after the final freeze cycle, plots B and E show the stack performance immediately after the fourth heat treatment, and plots C and F show the stack performance about 2 days after the fourth heat treatment. The results on air show a substantial and sustained improvement in post-freezing performance after the heat treatment. The improvement is believed to be attributable to improved mass transport in the MEA, based on the fact that on oxygen the performance was not significantly affected by the heat treatment. This indicates that performance loss after freezing may be, at least in part, due to mass transport issues in the cells, which have a more significant effect on air than on a substantially pure oxidant stream. These effects could be due to retained water in the membrane electrode assembly. It is possible that the heat treatment method assists in removing residual water from the membrane electrode assembly, and thereby improves performance at start-up, particularly on air.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of ceasing operation of an electric power generation system comprising a fuel cell stack connectable to an external electrical circuit for supplying electric current to said external circuit, said stack comprising at least one fuel cell comprising a membrane electrode assembly comprising an anode, a cathode, and an ion exchange membrane interposed between said anode and said cathode, said at least one fuel cell further comprising a fuel stream passage for directing a fuel stream to said anode and an oxidant stream passage for directing an oxidant stream to said cathode, each of said streams being flowable to said fuel cell stack, said method comprising the sequential steps of:

(a) interrupting the supply of electric current from said fuel cell stack to said external circuit;

(b) purging water from at least one of said passages by directing a fluid stream through said at least one of said passages;

wherein at least one of said fuel and oxidant streams is a humidified reactant stream, and said system further comprises a reactant stream humidifier for producing said humidified reactant stream from an incoming reactant stream by directing said incoming reactant stream therethrough, and step (b) comprises flowing said reactant stream to said fuel cell stack to purge said at least one passage, such that said humidifier is bypassed.

2. A method of ceasing operation of an electric power generation system comprising a fuel cell stack connectable to an external electrical circuit for supplying electric current to said external circuit, said stack comprising at least one fuel cell comprising a membrane electrode assembly comprising an anode, a cathode, and an ion exchange membrane interposed between said anode and said cathode, said at least one fuel cell further comprising a fuel stream passage for directing a fuel stream to said anode and an oxidant stream passage for directing an oxidant stream to said cathode, each of said streams being flowable to said fuel cell stack, said method comprising the sequential steps of:

(a) interrupting the supply of electric current from said fuel cell stack to said external circuit;

(b) purging water from at least one of said passages by directing a fluid stream through said at least one of said passages; and (c) reducing the temperature of at least a portion of said membrane electrode assembly to below the freezing temperature of water.

3. A method of ceasing operation of an electric power generation system comprising a fuel cell stack connectable to an external electrical circuit for supplying electric current to said external circuit, said stack comprising at least one fuel cell comprising a membrane electrode assembly comprising an anode, a cathode, and an ion exchange membrane interposed between said anode and said cathode, said at least one fuel cell further comprising a fuel stream passage for directing a fuel stream to said anode and an oxidant stream passage for directing an oxidant stream to said cathode, said method comprising the sequential steps of:

(a) interrupting the supply of electric current from said fuel cell stack to said external circuit;

(b) reducing the temperature of said at least one fuel cell to below the normal stack operating temperature;

(c) purging water from at least one of said passages.

4. The method of claim 3 wherein purge step (c) is commenced after the temperature of said fuel cell falls below a predetermined temperature threshold that is below said normal stack operating temperature.

5. The method of claim 4 wherein said temperature threshold is at least 20° C. below said normal stack operating temperature.

6. The method of claim 4 wherein said temperature threshold is in the range of 15° C. to 30° C.

7. The method of claim 4 wherein said temperature threshold is less than 10° C.

8. The method of claim 3 wherein step (c) comprises directing a fluid stream through said at least one of said passages.

9. The method of claim 3 wherein said at least one of said passages is said oxidant stream passage.

10. The method of claim 3 wherein at least one of said fuel and oxidant streams is a humidified reactant stream, and said system further comprises a reactant stream humidifier for producing said humidified reactant stream from an incoming reactant stream by directing said incoming reactant stream therethrough, and step (c) comprises flowing said reactant stream to said fuel cell stack to purge said at least one passage, such that said humidifier is bypassed.

11. The method of claim 3 further comprising:

(d) reducing the temperature of at least a portion of said membrane electrode assembly to below the freezing temperature of water.

12. The method of claim 8 wherein said fluid is a gas directed through said passage at a pressure less than about 30 psig.

13. The method of claim 8 wherein said fluid stream is an inert fluid stream.

14. The method of claim 13 wherein said fluid stream is nitrogen.

* * * * *